United States Patent [19]

Krause

[11] Patent Number: 4,921,100

[45] Date of Patent: May 1, 1990

[54] RACK LATCH ASSEMBLY

[75] Inventor: Duane K. Krause, Grosse Pointe Woods, Mich.

[73] Assignee: Chrysler Corporation, Highland Park, Mich.

[21] Appl. No.: 409,841

[22] Filed: Sep. 20, 1989

[51] Int. Cl.$^5$ .................. B65D 85/30; B65D 88/12
[52] U.S. Cl. .................. 206/448; 206/335; 206/509; 206/596; 206/451
[58] Field of Search .............. 206/448, 451, 452, 454, 206/386, 596, 335

[56] References Cited

U.S. PATENT DOCUMENTS 3,995,738 12/1976 Rowley et al. ............ 206/448 X
4,010,849 3/1977 Pater et al. ............... 206/448
4,074,823 2/1978 Pater et al. ............... 206/448 X

FOREIGN PATENT DOCUMENTS 2447325 9/1980 France ..................... 206/448

Primary Examiner—William Price
Attorney, Agent, or Firm—Edward A. Craig

[57] ABSTRACT

A shipping rack with a rack latch assembly capable of holding a plurality of vehicle parts, such as door panels, in separated arrangement during shipping and which allows easy removable of the parts and is reusable. The shipping rack is also adaptable to ship parts having slight dimensional variations in height. The door panels are supported in a vertical direction by engagement of the underside of the upper overturned flange of the door panel. Dunnage bars restrain movement of the door panel in a lateral direction and a holding bar is used to secure the lower portion of the door panel against longitudinal movement. A latching assembly is provided for securing the lower horizontally extending flange against movement in an upward direction. The latching assembly includes latching elements with a pair of vertically spaced horizontally extending arms for engaging the lower flange of door panels having slightly different vertical lengths.

8 Claims, 4 Drawing Sheets

RACK LATCH ASSEMBLY

BACKGROUND OF THE INVENTION

1. Field of the Invention

This invention relates to a shipping rack for shipping of a plurality of finished vehicle parts in spaced relationship. More particularly, the present invention relates to a shipping rack for shipping of finished interior door panels.

2. Prior Art

In modern manufacturing, it is common practice to assemble completed units at a single location from various parts and components which are shipped to the assembly location from other locations. The parts and components are normally fabricated in facilities remote from the assembly location and shipped to the assembly location in various shipping containers.

For instance, door panels of the type which are attached to the interior of a door for decorative purposes are often produced with a finished show surface portion which is readily seen from the interior of the vehicle, whereas the back portion of the panel remains unfinished and can not be seen from the interior of the vehicle. During shipping the finished show surface must be well protected in order to keep its new looking appearance. In the past, these parts were shipped in cartons or the like by separating one part from another with packing materials, such as by individually wrapping the parts. While such packing for shipping was generally adequate, at times, the parts could be damaged during shipping due to rough handling and/or shifting of the packing during shipping.

Prior to the assembly process the parts had to be manually unpacked and carefully handled until the final assembly operation was complete. Delays in production were often caused because of the time consuming nature of such an operation.

Also, because of the use of packing materials, a great deal of disposable material was involved and had to be dealt with during unpacking. Disposal of such packing materials proves to be costly and wasteful in the present day manufacturing climate.

In assembly line manufacturing operations of today it is common to assemble more than one vehicle model on the same assembly line. While the vehicles assembled are similar, there are sometimes slight variations in a particular part such as a door panel. In the past, it has been common to utilize separate shipping apparatuses for each type of part. These separate apparatuses complicated matters in that mixed shipments could not be easily made. It was also necessary to keep these apparatuses separate to ensure that the proper type of part was shipped in the proper shipping apparatus, thus, adding to the inefficiency of the shipping operation. From a materials handling perspective it is desirable to provide a shipping apparatus which can adapt for shipping of similar parts, with slight dimensional variations, to accommodate such an assembly operation, without the added expense or necessity of providing a separate shipping apparatus.

Therefore, it has been a goal in the art to provide a shipping device which allows easy packing of finished parts in separated relationship, such that the part's finished surfaces do not get damaged during shipping. It is a goal also to provide for easy removal and unpacking of the parts at the assembly location such that manufacturing time delays do not occur due to the shipping container used. It has also been a goal in the art to provide a shipping container which allows for shipping of slightly different dimensioned parts for assembly at a common location and which is reusable so as to avoid the problems and costs associated with disposal of used shipping materials.

SUMMARY OF THE INVENTION

According to the present invention there is provided a shipping rack for shipping of a plurality of finished vehicle parts in secure spaced relationship. The shipping rack of the present invention ensures that the finished show surfaces of the vehicle parts are substantially free from damaging contact with the shipping rack or with one another. The vehicle parts to be shipped on the racks of the present invention include an upper overturned flange portion and the lower horizontally extending flange portion. The shipping rack includes a lower wall portion having a length and a width and a pair of upstanding end walls at the end of the length of the lower wall. A plurality of securing elements vertically extend from the lower wall, each of which includes a means for supporting the upper overturned flange of the vehicle part against movement in a downward direction. A pair of dunnage bars are provided for restraining side lateral movement of the vehicle part. Longitudinally extending holding bars made of a nonmarring material are provided on the bottom wall. The holding bars have a series of cutout portions along its length corresponding to the number of securing elements for engaging the lower ends of the vehicle parts, for securing the vehicle part against movement of the lower end thereof in a longitudinal direction.

A latching assembly is provided for latching the vehicle part into position on the shipping rack and thereafter releasing the part for easy removal of a part from the shipping rack. The latching assembly includes a longitudinal member slideably journaled to the lower wall for longitudinal movement along the axis of the longitudinal bar. The bar includes a plurality of latching elements attached thereto which correspond in number to the number of parts to be latched. The latching elements are movable to a first position for engaging the lower horizontally extending flange of the vehicle part. The latching elements are also movable to a second position for releasing the part thereby allowing movement in an upward direction for removal of a part. Latching elements include a pair of vertically spaced latching surfaces. The latching surfaces provide for engagement of vehicle parts having different vertical heights. This allows for carrying of vehicle parts with different vertical lengths in the shipping rack.

Other advantages of the present invention will be readily appreciated as same becomes better understood by reference to the following description when considered in conjunction with the accompanying drawings.

BRIEF DESCRIPTION OF THE PREFERRED EMBODIMENT

Figure 1:
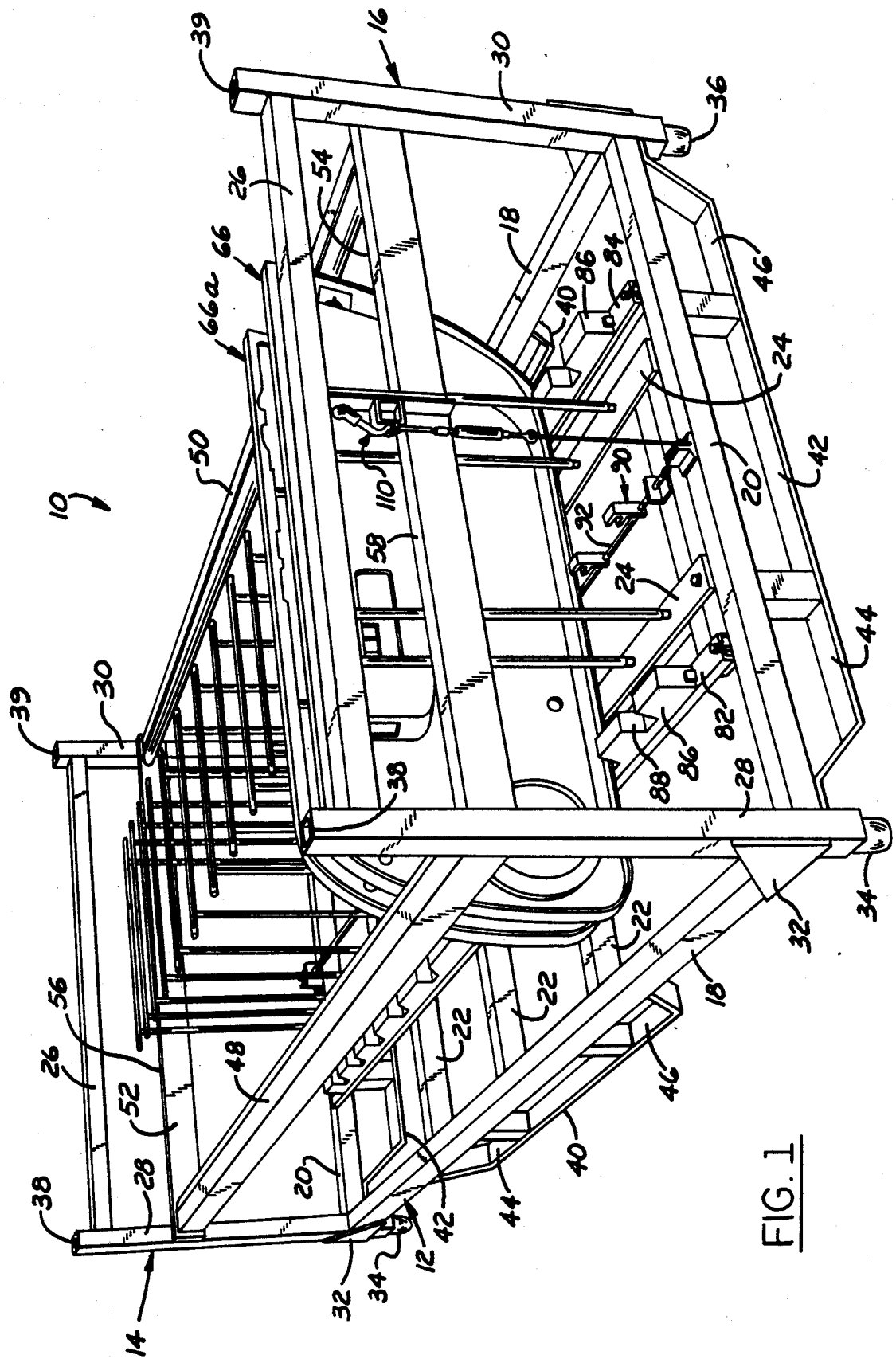
FIG. 1 is a perspective view of the shipping rack of the present invention.
Figure 2:
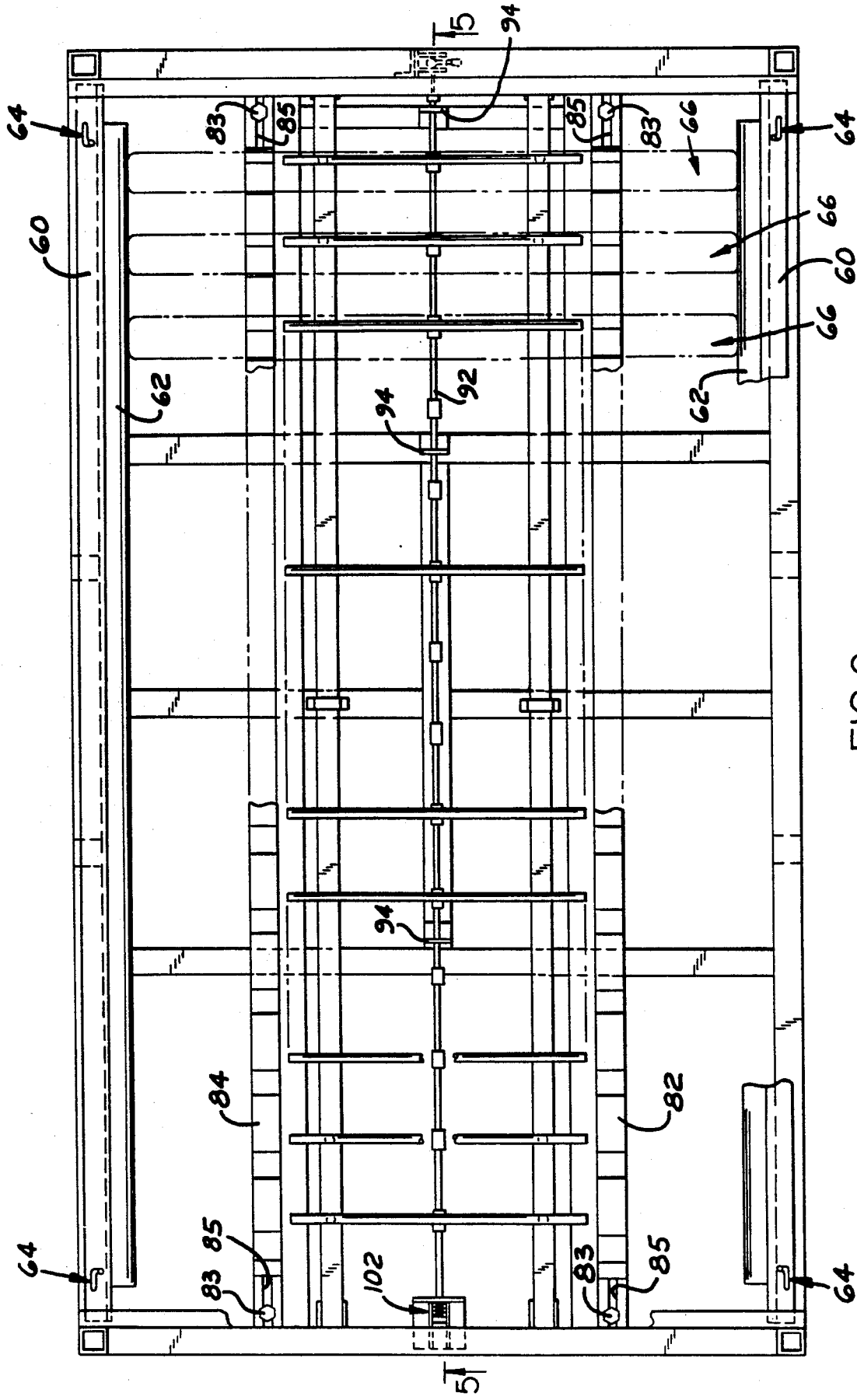
FIG. 2 is a top view of the shipping rack of FIG. 1.

Referring now to the drawings, the shipping rack 10 includes a bottom wall 12 which has a width and a length. Upstanding end walls 14 and 16 are attached at each end of the length of the bottom wall. The bottom and end walls are designed to be fabricated of welded tubular steel. Plastic materials may alternatively be used for fabrication purposes. The bottom wall 12 comprises a frame consisting of a pair of spaced side rail members 18 and a pair of spaced end rail members 20. Extending between these members are lateral elements 22 and longitudinal elements 24 which define a grid like pattern.

Each of the end walls comprise a frame consisting of upper rails 26, lower rails 20 and vertical end rails 28 and 30. These elements are also fabricated of tubular steel and welded together. The vertical end rails 28 and 30 are welded to adjacent ends of respective members 18 and 20 of the bottom wall, in the preferred embodiment herein, and are braced by welding of triangular metal pieces 32 at the lower corners thereof. Feet 34 and 36 extend from the lower end of the respective vertical rails 28 and 30. The feet 34 and 36 provide for stacking of the shipping racks by mating with the orifices 38 and 39 respectively in the upper ends of the vertical end rails of a like shipping rack during stacking. Pairs of bottom wall support structures 40 and 42 are welded to the side rail members 18 and end rail members 20 of the bottom wall 12. These support structures provide for support of the shipping rack when placed on a flat surface and also include spaced apart loops 44 and 46 which facilitate manipulation of the racks by way of a forklift truck for loading and unloading of the racks during transportation.

Channel members 56 and 58 extend horizontally between the vertical rail members 28 and 30. The channel members include tracks 52 and 54 for slideably receiving opposite ends of a dunnage bar.

A pair of dunnage bars 48 and 50 are slideable in tracks 52 and 54 of channel members 56 and 58. The dunnage bars 48 and 50 each include a bar portion 60 and a rubber bumper member 62. The bar portions include locking mechanisms 64 for locking of the bars laterally in the tracks 52, 54. Preferably, the dunnage bars are removable for accessing and removing the automobile parts held on the shipping rack. Dunnage bars 48 and 50 are also lockable in several lateral positions along the tracks to provide for securing different widths of automobile parts against lateral movement. The bumper members 62 are preferably hollow and made of a rubber material which is soft and non-marring to the finished surfaces of vehicle parts.

Figure 3:
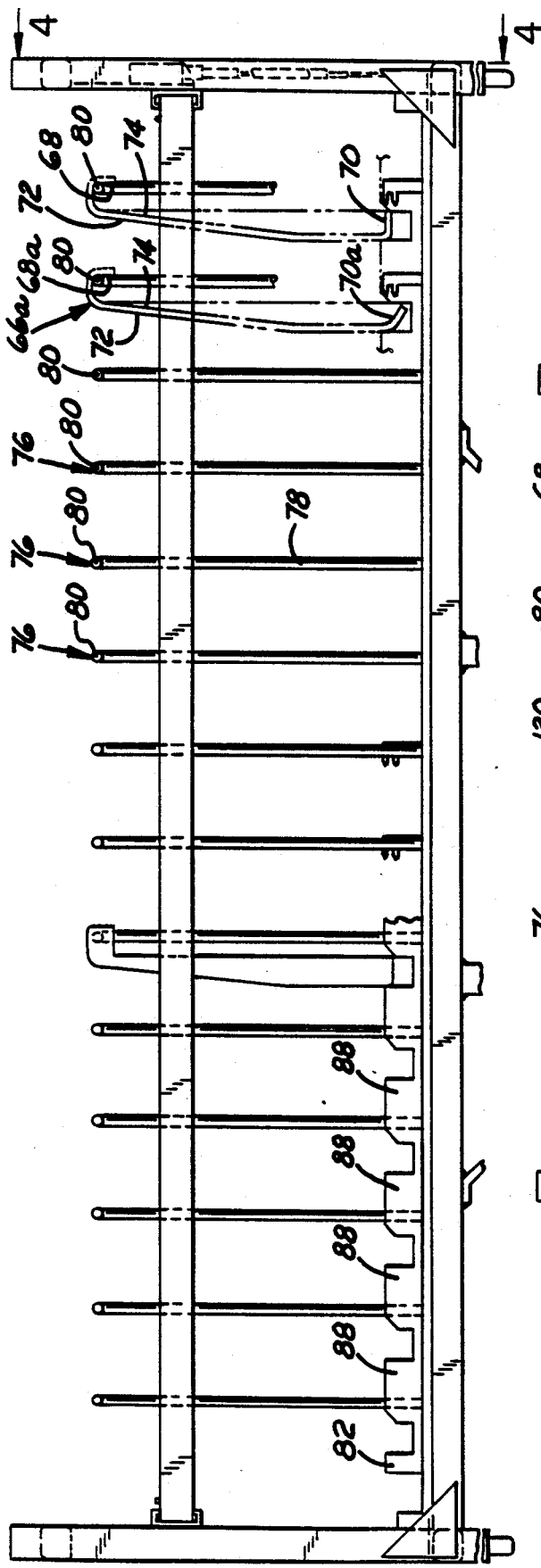
FIG. 3 is a side view of the shipping rack of FIG. 1.

Shipping rack 10 of the present invention is adapted for shipping a plurality of finished vehicle parts, such as door panels 66 and 66a, in a spaced relationship to prevent damage to the finished surface of the door panels. Door panel 66 includes an upper overturned flange 68 and a lower generally horizontally extending flange 70. Referring to FIG. 3, the shipping rack of the present invention may be utilized to ship door panels of slightly different heights. The door panel may be of a first type 66 which has a generally horizontally extending flange 70. Optionally, the door panel may be of a second type 66a which has a sloped or vertically lower flange portion, such as shown at 70a, which is spaced farther from the overturned lip portion 68a than the first type door panel 66. As shown in the drawings, door panels 66 and 66a may be advantageously carried by the same shipping rack of the present invention.

The door panels 66 and 66a include a finished show surface 72 on a first side and an unfinished surface 74 on the back side.

In the final application the finished show surface 72 is seen from the interior of the vehicle and therefore, is required to be protected during shipping of the part. The unfinished surface 74 is not in need of protection since it will not be seen in the final vehicle application. Thus, in the present invention a shipping rack is provided wherein the vehicle part is supported at portions of the unfinished side of the vehicle part thereby protecting the finished show surface 72.

A plurality of securing elements 76 are provided which vertically extend from the lower wall 12. The securing elements 76 include a pair of laterally spaced upstanding leg members 78 which are laterally connected by a cross-bar portion 80. The leg members 78 are connected to longitudinally extending laterally spaced rail members 24. The lateral cross-bar portion 80 is provided for supporting the overturned flange 68 and 68a of the door panels 66 and 66a.

A pair of longitudinally extending holding bars 82 and 84 are attached to the bottom wall 12 and laterally spaced. The holding bars 82 and 84 include a rubber insert 86 which has a series of cutout openings 88 which correspond in number to the number of securing elements 76. The holding bars are bolted to the bottom wall by bolts 83. The holding bars include elongated grooves 85 providing for longitudinal adjustment of insert 86 if necessary. The cutout openings 88 are sized such as to correspond to the bottom width of the door panel to be carried, and are made from a non-marring rubber material such that they will not harm the finished show surface 72 of the door panel 66 or 66a. The walls of these cutout portions act to engage the lower surfaces of the door panels to prevent movement of this portion of the door panels in a longitudinal direction.

A latching assembly generally shown at 90 is provided for locking of the door panels from movement in the upward direction thereby securing the door panel in the rack. The latching assembly 90 of the present invention allows adaptability to parts of varying height such that similar parts differing in slight vertical dimensions may be advantageously shipped on a single rack.

The latching assembly 90 includes a longitudinal bar 92 which is slideably journalled to the lower wall 12 for longitudinal movement along the axis of the bar 92. The bar is slideably mounted by way of brackets 94 which extend upwardly from the bottom wall 12. Brackets 94 have suitable bearing surfaces for allowing sliding of the bar. A plurality of latching elements 96 which correspond in number to the number of parts to be held i.e., the number of securing elements 76, are attached to the bar 92 in longitudinally spaced relationship. The elements 96 are attached to the slideable rod 92 by way of a press-fit pin 95. The latching elements 96 are movable by the sliding of bar 92 to a first position for engaging the lower horizontally extending flange 70 of a door panel or to a second position (as shown in FIG. 3) wherein the part is released for allowing movement thereof in an upward direction.

The latching elements 96 include a pair of vertically spaced horizontally extending latching arms 97 and 99 having latching surfaces 98 and 100. The spacing of arms 97 and 99 provide for engagement of the latching surfaces 98,100 with the lower flanges of vehicle parts having different heights i.e., by either engagement of flange 70 of the first type of door panel 66 by surface 98 of the arm 97 or flange 70a of the second type of door panel 66a, by surface 100 of arm 99. The terminal ends of the latching arms 97 and 99 are tapered to further facilitate secure latching of the flanges such that if the flange is slightly higher than surfaces 98 or 100 the lower tapered surface will tend to pull the lower flange downward during sliding of the arm 97 or 99 onto the lower flange 70 or 70a.

Figure 5:
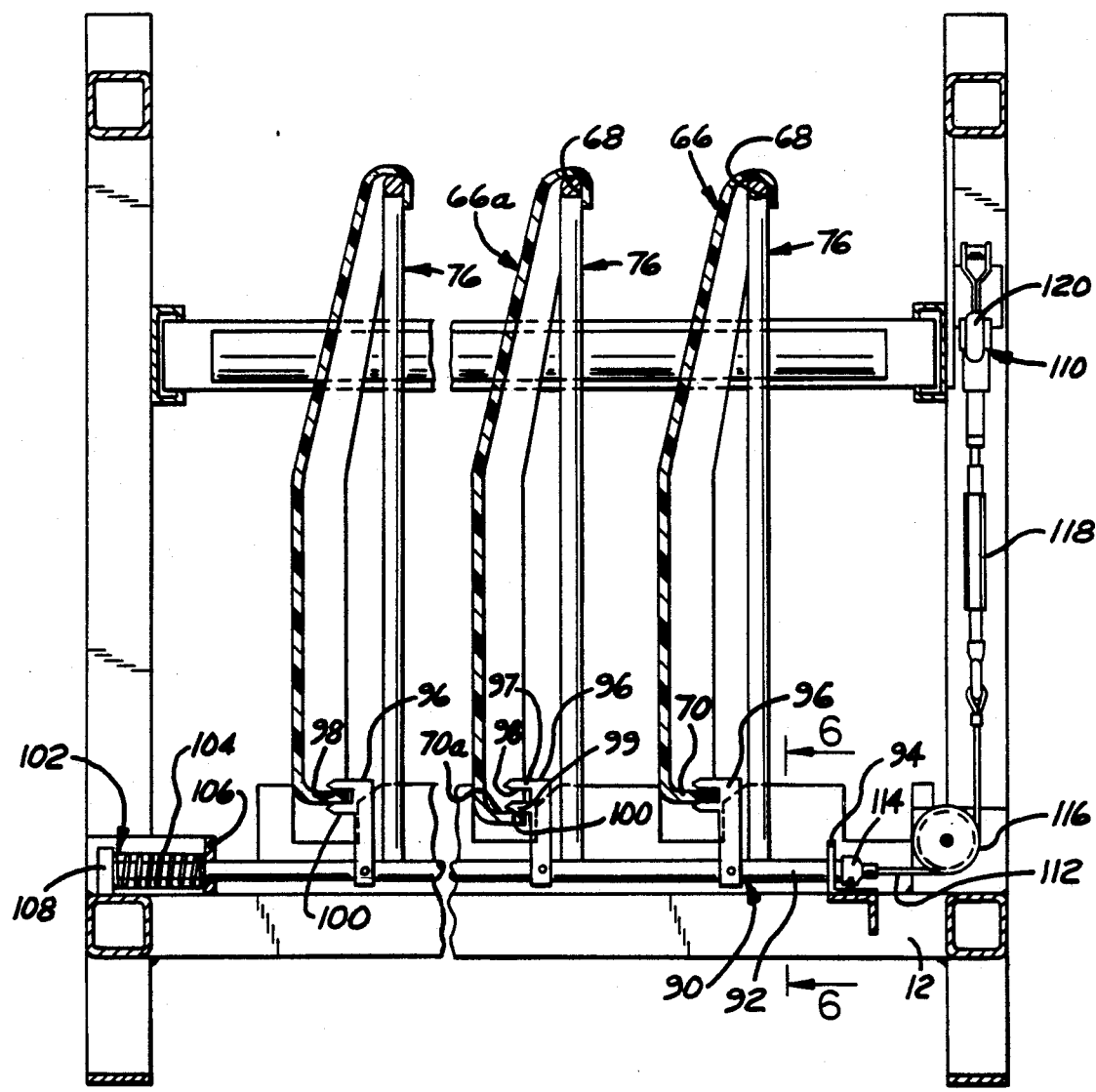
FIG. 5 is a sectional view partially broken away taken along lines 5—5 of FIG. 2.
Figure 6:
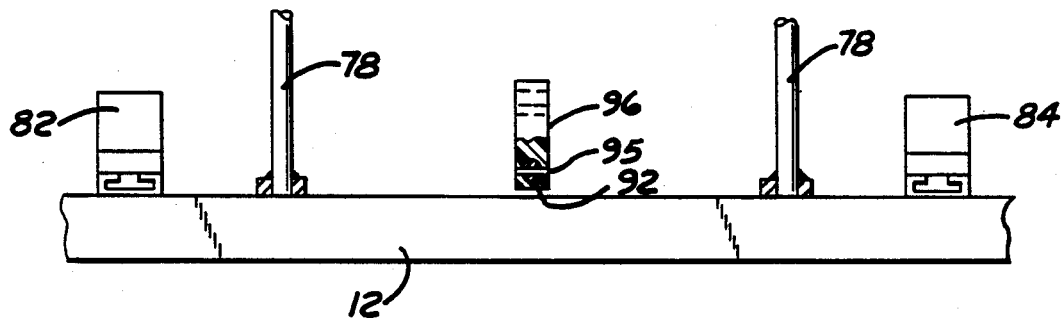
FIG. 6 is a detailed sectional view taken along lines 6—6 of FIG. 5.

A spring assembly 102 is provided for biasing the elements toward a normal position which is in the first latched position (as shown in FIG. 5). The spring assembly 102 includes a helical spring 104 which is contained between an upwardly extending flange 106 and a T-bar portion 108 attached to one end of the bar 92. The rod is slideable in flange 106 and the spring tension from helical spring 104 biases the rod toward movement to the first latched position.

An unlatching assembly 110 is provided for actuating the latching elements 96 to the second position wherein vehicle parts may be removed. The latching assembly 110 includes a cable 112 which is attached to the other end of bar 92 at coupling 114. The cable 112 is routed through a pulley assembly 116 into a turn-buckle adjustment assembly 118 which is connected with a lever assembly 120.

Figure 4:
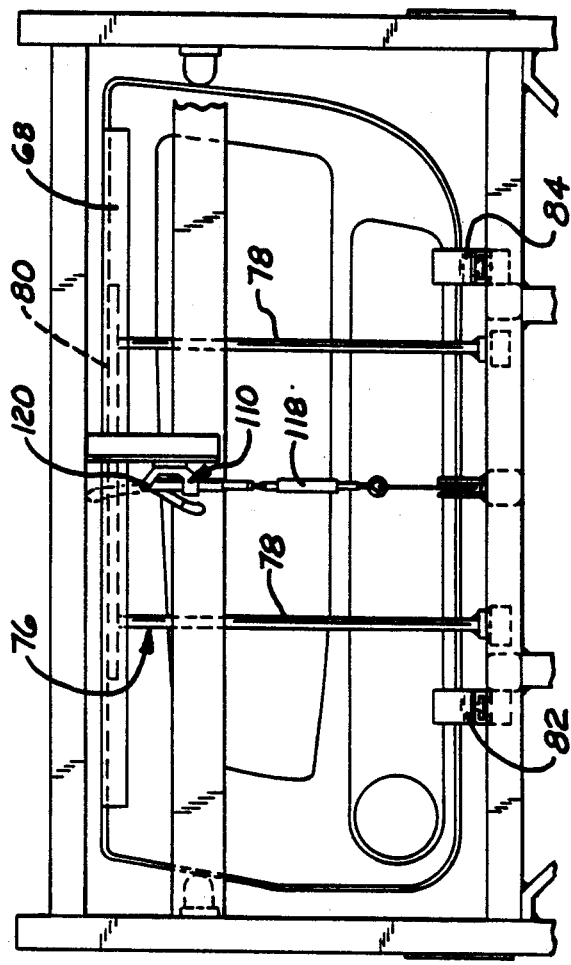
FIG. 4 is an end view of the shipping rack of FIG. 1.

In operation, in the latched position the lever 120 will be in the down position, as shown in FIG. 4. When it is desired to release the part the lever may be moved to the upwardly extending position, as shown in phantom in FIG. 4. Movement of the lever to the upwardly extending position acts to pull on the cable 112 for sliding of bar 92 thereby moving latching elements 96 into the second position for disengagement of the flange 70 or 70a of the door panel.

Thus, in operation, with a first type of door panel 66 which has a vertical height corresponding to the distance between overturned flange 68 and the flange 70, the surface 98 will engage the flange 70 for securing the door panel in the shipping rack. The shipping rack of the present invention also allows shipping of a slightly different part 66a which has a larger vertical dimension corresponding to the distance between overturned flange 68a and flange 70a, wherein the lower horizontal surface 100 of the element 96 engages the flange 70a to securely hold the part on the shipping rack.

While the above description constitutes the preferred embodiment of the present invention, it is to be appreciated that the invention is susceptible to modification, variation and change without departing from the proper scope and fair meaning of the accompanying claims.

I claim:

1. A shipping rack for shipping of a plurality of finished vehicle parts in secure spaced relationship for ensuring that the finished show surfaces of the vehicle parts are substantially free from damaging contact with the shipping rack or with one another, said vehicle parts including an upper overturned flange portion and a lower generally horizontally extending flange portion, said shipping rack comprising: a lower wall portion having a length and a width; a pair of upstanding end walls at each end of the length of said lower wall; a plurality of securing elements vertically extending from said lower wall, each including a means for supporting the upper overturned flange of said vehicle part against movement in a downward direction; a pair of dunnage bars for restraining side lateral movement of said vehicle part; a longitudinally extending holding bar made of a non-marring material and having a series of indentations therein corresponding to the number of said plurality of securing elements for engaging the lower ends of said vehicle parts for securing the vehicle parts against movement of the lower end thereof in a longitudinal direction; and a latching assembly for latching the vehicle part into position on said shipping rack, said latching assembly including: a longitudinal bar slideably journaled to said lower wall for longitudinal movement along the axis of the bar, a plurality of latching elements attached along the length of said bar corresponding in number to the number of parts to be latched, and a means for actuating said latching elements into a first position for engaging the lower horizontally extending flange of said vehicle part and to a second position for releasing the part, said latching elements including a pair of vertically spaced latching surfaces, said latching surfaces providing for engagement of vehicle parts having different lengths between the upper overturned flange and the lower extending flange portion thereby allowing for carrying of vehicle parts of different vertical lengths in said shipping rack.

2. The shipping rack of claim 1 wherein said means for actuating said latching elements further comprises:
a spring assembly for biasing said bar toward normal positioning of said latching elements into said first position and an unlatching assembly for moving said latching elements out of said first position into said second position and holding said latching elements in said second position.

3. The shipping rack of claim 1 wherein said vehicle parts further comprise door panels.

4. The shipping rack of claim 1 wherein said securing elements further comprise a pair of upstanding leg members secured to the bottom wall and said means for supporting upper overturned flange further comprises a horizontally disposed cross-bar attached at the upper end of said leg members, said connecting bar acting to support said overturned flange along an extended length thereof.

5. The shipping rack of claim 2 wherein said unlatching assembly further comprises:
a cable attached at a first end thereof to a terminal end of said bar, and a lever assembly attached at a second end of said cable, and a pulley assembly interposed therebetween said lever assembly for actuating said longitudinal bar through said cable for actuating and holding said latching elements in said second position.

6. A shipping rack for shipping of a plurality of finished door panels in a secure spaced relationship for ensuring that the finished show surfaces of the door panels are substantially free from damaging contact with the shipping rack or with one another, said door panels including an upper overturned flange and a lower generally horizontally extending flange portion, said shipping rack comprising: a lower wall having a length and a width; a pair of upstanding end walls at each end of the length of said lower wall; a securing means for vertically securing a plurality of said door panels along the length of said lower wall in a longitudinally spaced relationship by engaging the underside of said upper overturned flange thereby securing the door panel from movement in a downward direction; a means for preventing lateral movement of said vehicle parts while held on said securing means; a means for engaging the lower width of said vehicle part at said flange portion for securing the door panel from movement of the lowermost portion of said door panel in a longitudinal direction; and a latching assembly, for engaging the lower flange of said door panel, said latching assembly including: a longitudinal bar slideably journaled to said lower wall for longitudinal movement along the axis of the bar; a plurality of upstanding latching elements attached along the length of said bar, said plurality of latching elements corresponding in number to the number of door panels to be latched, said latching elements including a pair of vertically spaced latching arms; a means for actuating said latching elements by sliding of said bar into a first position for engaging the upper surface of the lower generally horizontally extending flange and actuating said latching elements by sliding of said bar to a second position for releasing the door panel, said latching arms providing for engagement of door panels having different lengths between the upper overturned flange and the lower generally horizontally extending flange, thereby allowing for carrying of door panels of different vertical lengths in said shipping rack.

7. The shipping rack of claim 6 wherein said means for actuating said latching elements further comprises:
a spring assembly for biasing said bar toward normal positioning of said latching elements into said first position and an unlatching assembly for moving said latching elements out of said first position into said second position and holding said latching elements in said second position.

8. The shipping rack of claim 7 wherein said unlatching assembly further comprises:
a cable attached at a first end thereof to a terminal end of said bar, and a lever assembly attached at a second end of said cable, and a pulley assembly interposed therebetween said lever assembly for actuating said longitudinal bar through said cable for actuating and holding said latching elements in said second position.

* * * * *